(12) United States Patent
Foxlin (10) Patent No.: US 7,301,648 B2
(45) Date of Patent: *Nov. 27, 2007

(54) SELF-REFERENCED TRACKING

(75) Inventor: Eric Foxlin, Arlington, MA (US)

(73) Assignee: InterSense, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/463,776

(22) Filed: Aug. 10, 2006

(65) Prior Publication Data

US 2006/0284792 A1    Dec. 21, 2006

Related U.S. Application Data

(63) Continuation of application No. 10/837,373, filed on Apr. 30, 2004, which is a continuation of application No. 09/770,691, filed on Jan. 26, 2001, now Pat. No. 6,757,068.

(60) Provisional application No. 60/178,797, filed on Jan. 28, 2000.

(51) Int. Cl.
*G01B 11/14* (2006.01)
(52) U.S. Cl. .................................... 356/620
(58) Field of Classification Search ................. 356/620
See application file for complete search history.

(56) References Cited

U.S. PATENT DOCUMENTS

| | | | |
|---|---|---|---|
| 4,988,981 A * | 1/1991 | Zimmerman et al. | 345/158 |
| 5,526,022 A * | 6/1996 | Donahue et al. | 345/156 |
| 5,615,132 A | 3/1997 | Horton et al. | |
| 5,645,077 A * | 7/1997 | Foxlin | 600/587 |
| 5,812,257 A * | 9/1998 | Teitel et al. | 355/141.4 |
| 5,854,843 A * | 12/1998 | Jacknin et al. | 381/309 |
| 5,991,085 A * | 11/1999 | Rallison et al. | 359/630 |
| 6,005,548 A * | 12/1999 | Latypov et al. | 345/156 |
| 6,176,837 B1 | 1/2001 | Foxlin | |
| 6,474,159 B1 | 11/2002 | Foxlin et al. | |
| 6,757,068 B2 * | 6/2004 | Foxlin | 358/620 |
| 2003/0158699 A1 * | 8/2003 | Townsend et al. | 702/151 |

FOREIGN PATENT DOCUMENTS

DE    198 30 359    1/2000

OTHER PUBLICATIONS

E. Foxlin, "Head-tracking relative to a moving vehicle or simulator platform using differential inertial sensors".
E. Foxlin, "Inertial head-tracking", M.S. Thesis, Dept. of E.E.C.S., MIT, 1993.
E. Foxlin, "Inertial head-tracker sensor fusion by a complementary separate-bias kalman filter", Proc. VRAIS '96 Virtual Reality Annual Intl. Symposium, Santa Clara, CA 1996.

(Continued)

*Primary Examiner*—Roy M. Punnoose
(74) *Attorney, Agent, or Firm*—Fish & Richardson P.C.

(57) ABSTRACT

A new tracking technique is essentially "sourceless" in that it can be used anywhere with no set-up, yet it enables a much wider range of virtual environment-style navigation and interaction techniques than does a simple head-orientation tracker. A sourceless head orientation tracker is combined with a head-worn tracking device that tracks a hand-mounted 3D beacon relative to the head. The system encourages use of intuitive interaction techniques which exploit proprioception.

44 Claims, 5 Drawing Sheets

OTHER PUBLICATIONS

E. Foxlin et al., "Miniature 6-DOF inertial system for tracking HMDs", SPIE vol. 3362, Proc. AeroSense '98 Conference on Helmet- and Head-Mounted Displays III, Orlando, FL 1998.

InterSense Inc. homepage—http://www.isense.com.

K. Britting, "Inertial navigations systems analysis", New York, Wiley Interscience, 1971.

C. Broxmeyer, "Inertial navigation systems", New York, McGraw-Hill, 1964.

R. Parvin, "Inertial Navigation", Princeton, New Jersey, Van Nostrand, 1962.

R.G. Brown et al., "Introduction to random signals and applied Kalman filtering", $2^{nd}$ edition, New York, John Wiley & Sons, 1992.

William Frey, Michael Zyda, Robert McGhee, Bill Cockayne, Off-the-Shelf, Real-Time, Human Body Motion Capture for Synthetic Environments, 1995, Computer Science Department, Navel Postgraduate School, Monterey, CA 93943-5118.

* cited by examiner

SELF-REFERENCED TRACKING

RELATED APPLICATIONS

This application is a continuation of and claims priority under 35 USC §120 to U.S. patent application Ser. No. 10/837,373, filed on Apr. 30, 2004, which is a continuation of U.S. patent application Ser. No. 09/770,691, filed on Jan. 26, 2001 now U.S. Pat. No. 6,757,068, which is entitled under 35 USC § 119(e) to the benefit of the filing date of U.S. Provisional Patent Application Ser. No. 60/178,797, filed on Jan. 28, 2000, the contents of each which are hereby incorporated by reference.

BACKGROUND

This invention relates to self-referenced tracking.

Virtual reality (VR) systems require tracking of the orientation and position of a user's head and hands with respect to a world coordinate frame in order to control view parameters for head mounted devices (HMDs) and allow manual interactions with the virtual world. In laboratory VR setups, this tracking has been achieved with a variety of mechanical, acoustic, magnetic, and optical systems. These systems require propagation of a signal between a fixed "source" and the tracked "sensor" and therefore limit the range of operation. They also require a degree of care in setting up the source or preparing the site that reduces their utility for field use.

The emerging fields of wearable computing and augmented reality (AR) require tracking systems to be wearable and capable of operating essentially immediately in arbitrary environments. "Sourceless" orientation trackers have been developed based on geomagnetic and/or inertial sensors. They allow enough control to look around the virtual environment and fly through it, but they don't enable the "reach-out-and-grab" interactions that make virtual environments so intuitive and which are needed to facilitate computer interaction.

SUMMARY

In one aspect, in general, the invention provides a new tracking technique that is essentially "sourceless" in that it can be used anywhere with no set-up of a source, yet it enables a wider range of virtual environment-style navigation and interaction techniques than does a simple head-orientation tracker, including manual interaction with virtual objects. The equipment can be produced at only slightly more than the cost of a sourceless orientation tracker and can be used by novice end users without any knowledge of tracking technology, because there is nothing to set up or configure.

In another aspect, in general, the invention features mounting a tracker on a user's head and using the tracker to track a position of a localized feature associated with a limb of the user relative to the user's head. The localized feature associated with the limb may include a hand-held object or a hand-mounted object or a point on a hand.

In another aspect, in general, the invention features mounting a sourceless orientation tracker on a user's head and using a position tracker to track a position of a first localized feature associated with a limb of the user relative to the user's head.

In another aspect, in general, the invention features tracking a point on a hand-held object such as a pen or a point on a hand-mounted object such as a ring or a point on a hand relative to a user's head.

In another aspect, in general, the invention features using a position tracker to determine a distance between a first localized feature associated with a user's limb and a second localized feature associated with the user's head.

In another aspect, in general, the invention features a position tracker which includes an acoustic position tracker, an electro-optical system that tracks LEDs, optical sensors or reflective marks, a video machine-vision device, a magnetic tracker with a magnetic source held in the hand and sensors integrated in the headset or vice versa, or a radio frequency position locating device.

In another aspect, in general, the invention features a sourceless orientation tracker including an inertial sensor, a tilt-sensor, or a magnetic compass sensor.

In another aspect, in general, the invention features mounting a display device on the user's head and displaying a first object at a first position on the display device.

In another aspect, in general, the invention features changing the orientation of a display device, and, after changing the orientation of the display device, redisplaying the first object at a second position on the display device based on the change in orientation.

In another aspect, in general, the invention features determining the second position for displaying the first object so as to make the position of the first object appear to be fixed relative to a first coordinate reference frame, which frame does not rotate with the display device during said changing of the orientation of the display device.

In another aspect, in general, the invention features displaying the first object in response to a signal from a computer.

In another aspect, in general, the invention features mounting a wearable computer on the user's body, and displaying a first object in response to a signal from the wearable computer.

In another aspect, in general, the invention features displaying at least a portion of a virtual environment, such as a fly-through virtual environment, or a virtual treadmill, on the display device.

In another aspect, in general, the invention features displaying a graphical user interface for a computer on the display device.

In another aspect, in general, the invention features first object being a window, icon or menu in the graphical user interface.

In another aspect, in general, the invention features the first object being a pointer for the graphical user interface.

In another aspect, in general, the invention features changing the position of the first localized feature relative to the position tracker and, after changing the position of the first localized feature, redisplaying the first object at a second position on the display device determined based on the change in the position of the first localized feature.

In another aspect, in general, the invention features displaying a second object on the display device, so that after changing the position of the first localized feature, the displayed position of the second object on the display device does not change in response to the change in the position of the first localized feature.

In another aspect, in general, the invention features determining the second position so as to make the position of the first object appear to coincide with the position of the first localized feature as seen or felt by the user.

In another aspect, in general, the invention features changing the orientation of the first coordinate reference frame in response to a signal being received by the computer.

In another aspect, in general, the invention features changing the orientation of the first coordinate reference frame in response to a change in the position of the first localized feature.

In another aspect, in general, the invention features changing the orientation of the first coordinate reference frame in response to a signal representative of the location of the user.

In another aspect, in general, the invention features changing the orientation of the first coordinate reference frame in response to a signal representative of a destination.

In another aspect, in general, the invention features changing the orientation of the first coordinate reference frame in response to a signal representative of a change in the user's immediate surroundings.

In another aspect, in general, the invention features changing the orientation of the first coordinate reference frame is changed in response to a signal representative of a change in the physiological state or physical state of the user.

In another aspect, in general, the invention features redisplaying the first object further comprises changing the apparent size of the first object according to the change in position of the first localized feature.

In another aspect, in general, the invention features mounting a portable beacon, transponder or passive marker at a fixed point in the environment and determining the position vector of a second localized feature associated with the user's head relative to the fixed point.

In another aspect, in general, the invention features determining the position vector of the first localized feature relative to the fixed point.

In another aspect, in general, the invention features mounting a sourceless orientation tracker on a second user's head and determining the position of a localized feature associated with the body of the second user relative to the fixed point.

In another aspect, in general, the invention features determining the position vector of a second localized feature associated with the user's head relative to the fixed point without determining the distance between the second localized feature and more than one fixed point in the environment.

In another aspect, in general, the invention features displaying the first object at a third position after displaying the first object at the third position, changing the orientation of the display, and after changing the orientation of the display, continuing to display the first object at the third position.

In another aspect, in general, the invention features the first object being a window in a wraparound computer interface.

In another aspect, in general, the invention features redisplaying the changed position of the first localized feature not being within the field of view of the display when the first object is redisplayed.

In another aspect, in general, the invention features displaying the first object at a position coinciding with the position of the first localized object when the first localized object is within the field of view of the display.

In another aspect, in general, the invention features positioning the first localized feature at a first point positioning the first localized feature at a second point and calculating the distance between the first point and the second point.

In another aspect, in general, the invention features determining a position vector of the first localized feature relative to a second localized feature associated with the user's head and modifying the position vector based on an orientation of the user's head.

In another aspect, in general, the invention features setting an assumed position for the user's head in a coordinate system and setting a position for the first localized feature in the coordinate system based on the assumed position of the user's head and said position vector.

In another aspect, in general, the invention features measuring the orientation of the user's head relative to a fixed frame of reference.

In another aspect, in general, the invention features setting a virtual travel speed and direction for the user modifying the assumed position for the user's head based on the user's virtual travel speed and direction.

In another aspect, in general, the invention features mounting on the head of a user a three degree of freedom orientation tracker for tracking the orientation of the head, and a three degree of freedom position tracker for tracking the position of a first localized feature on the user's limb relative to a second localized feature on the user's head, computing a position vector for the first localized feature relative to the second localized feature, determining a rotation matrix based on information received from the rotation tracker, and transforming the position vector into a position vector for a fixed frame of reference based on the rotation matrix.

In another aspect, in general, the invention features using an acoustic or radio frequency position tracker to track a position of a first localized feature associated with a limb of the user relative to the user's head.

In another aspect, in general, the invention features mounting a video camera on the back of the user's head and displaying an image generated by the video camera in a portion of a display device mounted on the user's head.

In another aspect, in general, the invention features mounting a first inertial sensor on a user's head, mounting a second inertial sensor elsewhere on the user's body or in an object held by the user, and tracking the position of one inertial sensor relative to the other.

Some embodiments of the invention include sensing data at the first and second inertial sensors and using the sensed data to track the position of one inertial sensor relative to the other, tracking the position of the inertial sensor is done without reference to any signal received from a source not mounted on or held by the user and correcting the drift of the relative position or orientation of the second inertial sensor relative to the first inertial sensor by measurements between devices on the user's head and devices elsewhere on the users body.

Among the advantages of the invention are one or more of the following. The device is easy to don, can track both head and hand, adds no new cables to a wearable computer system, works anywhere indoors or outdoors with no preparation, and is simpler than alternatives such as vision-based self-tracking.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
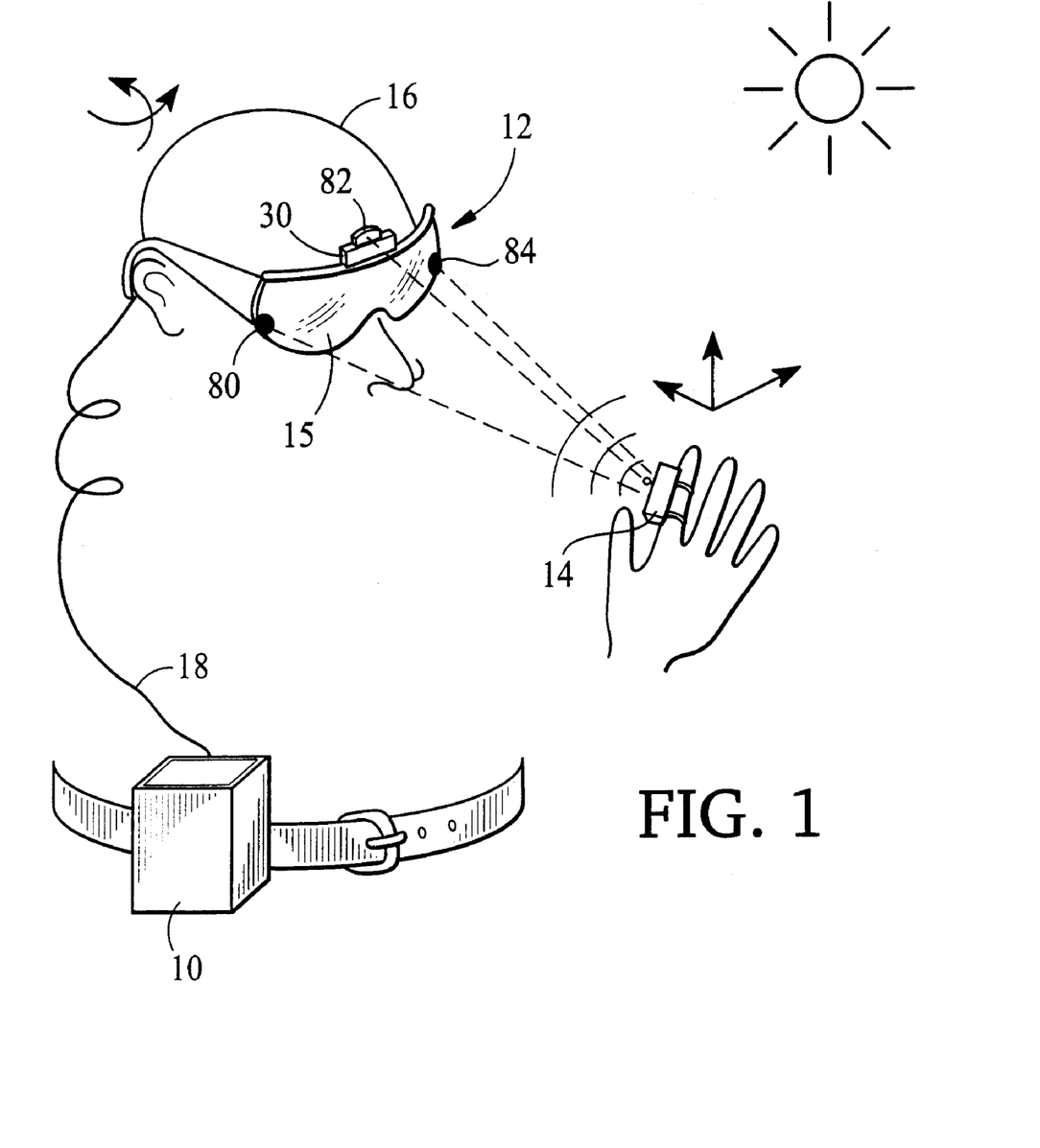
FIG. 1 is a perspective view of a self-referenced tracking device mounted on a head.

As seen in FIG. 1, implementations of the invention may combine a sourceless head orientation tracker 30 with a head-worn tracking device 12 that tracks a hand-mounted 3D beacon 14 relative to the head 16. One implementation uses a wireless ultrasonic tracker 12, which has the potential for low cost, lightweight, low power, good resolution, and high update rates when tracking at the relatively close ranges typical of head-hand displacements.

As FIG. 1 illustrates, this arrangement provides a simple and easy to don hardware system. In a fully integrated wearable VR system using this tracker there are only three parts (a wearable computer 10, a headset 15 with an integrated tracking system, and a hand-mounted beacon 14) and one cable connection 18. This is possible because the entire ultrasonic receiver system 12 for tracking the beacon can be reduced to a few small signal-conditioning circuits and integrated with the sourceless orientation tracker 30 in the head-worn display 15. By sharing the microprocessor and its power and communications link to the wearable, the cost and complexity are reduced.

The benefits of this combination of elements stem from these realizations:

1. It is usually not important to track the hand unless it is in front of the head. Thus range and line-of-sight limitations are no problem if the tracker is mounted on the forehead.

2. The hand position measured in head space can be transformed into world space with good seen/felt position match using an assumed head pose, no matter how inaccurate.

3. Using one fixed beacon, the same tracking hardware can provide full 6-DOF tracking.

Implementations of the invention may exhibit:

1. A new tracking concept that enables immersive visualization and intuitive manual interaction using a wearable system in arbitrary unprepared environments.

2. An information cockpit metaphor for a wearable computer user interface and a set of interaction techniques based on this metaphor.

Figure 2:
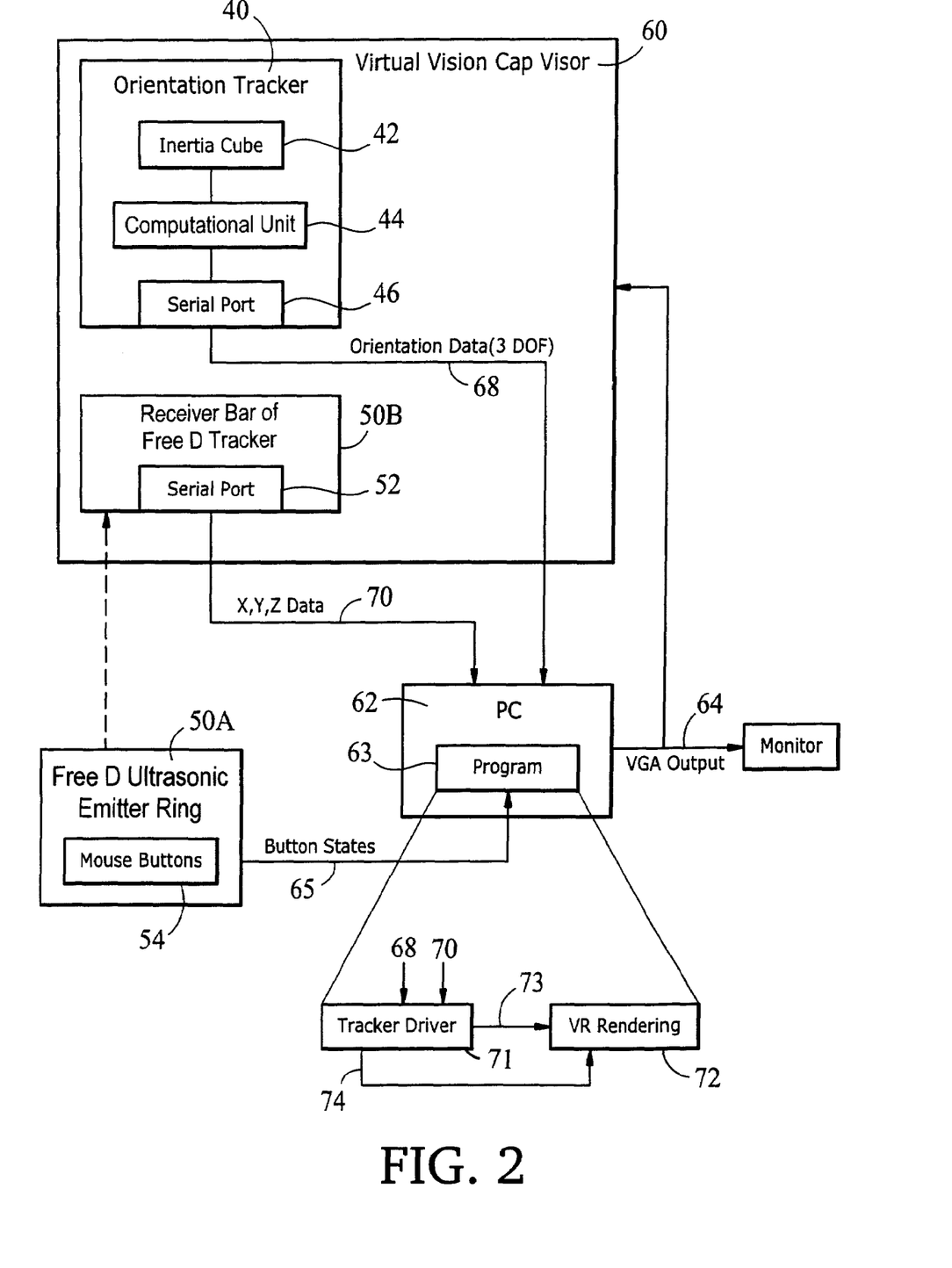
FIG. 2 is a block diagram.

As shown in FIG. 2, a simple proof-of-concept implementation combines an InterSense IS-300 sourceless inertial orientation tracker 40 (available from InterSense, Inc., in Burlington, Mass.) with a Pegasus FreeD ultrasonic position tracker 50 (available from Pegasus Technologies Ltd. in Holon, Israel). The IS-300 has an "InertiaCube" inertial sensor assembly 42, just over an inch on a side, cabled to a small computational unit 44 that outputs orientation data through a serial port 46. The FreeD product consists of a finger-worn wireless ultrasonic emitter 50A with two mouse buttons 54, and an L-shaped receiver bar 50B which normally mounts on the frame of a computer monitor, and outputs x,y,z data through a serial port. For our experiments we mounted the InertiaCube and the L-shaped receiver bar on the visor 60 of a V-Cap 1000 see-through HMD (available from Virtual Vision of Seattle, Wash.). The FreeD therefore measures the ring position relative to the head-fixed coordinate frame whose orientation was measured by the IS-300.

Data from both trackers is transmitted to a PC 62 (Pentium 300 MHz, Windows 98) running a program 63 that uses Windows DirectX and Direct3D capabilities to display graphics and effect interaction techniques. The graphics output window of Direct3D is maximized to take control over the entire screen, and VGA output 64 (640×480 at 60 Hz) is passed into the V-Cap HMD as well as a desktop monitor.

The program 63 includes a tracker driver 71 and a fairly conventional VR rendering environment 72 that expects to receive 6-DOF head and hand tracking data from the tracker driver as well as button states 65 for the hand tracking device. The interaction techniques to be described are implemented in the tracker driver. The basic functions of the tracker driver, when tracking a single 3-DOF point on the hand, are:

1. Read in and parse the orientation data 68 from the IS-300 and the position triad 70 from the FreeD.

2. Package the orientation data with the current head position in world-frame, and output the combined 6-DOF data record 73 for the head to the VR program. The current assumed world-frame head position is the same as the previous one unless the user is in the process of performing a navigation interaction such as flying. In this case the position is incremented based on the flying speed and direction.

3. Transform the hand position vector from head frame to world frame by first multiplying by the rotation matrix from head to world frame obtained from the orientation tracker, then adding the current assumed world-frame head position. Output the result to the VR program as a 3-DOF position record 74 for the hand device.

The simple implementation just described is wearable, but cannot be integrated into an HMD elegantly, largely due to the size and power consumption of the IS-300 processing unit. A low-cost wearable version using available technologies could be implemented as follows:

The core of this implementation is an inertial head orientation module called InterTrax 2 (available from InterSense and designed for use with consumer HMDs such as the Sony Glasstron and Olympus EyeTrek). Using tiny piezoelectric camcorder gyros, and solid-state accelerometers and magnetometers, InterTrax 2 is designed as a single long narrow circuit board 30 (FIG. 1) to lie across the top of the head mounted display unit along the brow line. It is 9 cm long, 2 cm wide, and 0.5 cm thick with all components, except for a vertical gyro in the center, which sticks up 1 cm higher. It contains a low-power embedded 16-bit processor that runs a simplified fixed-point version of the GEOS drift-corrected orientation-tracking algorithm used in the IS-300. It communicates to the host through a single USB connector through which it draws its power, and can be manufactured for very low cost in volume. It is expected to achieve accuracy on the order of 2-3°, which is sufficient because the accuracy with which the hand avatar follows the physical hand is totally independent of orientation tracking accuracy.

Another component is an embedded ultrasonic rangefinder (perhaps based on the Pegasus FreeD technology). As shown in FIG. 1, three microphones 80, 82, 84 and their ultrasonic pulse detection circuits together with the InterTrax 2 board are embedded in a rigid plastic assembly designed to fit elegantly over the brow of an HMD. (In some embodiments, all components would be embedded inside the HMD display unit while sharing the HMD's cable 18, but in others, the added components are clipped on) The InterTrax 2 processor has enough unused timer inputs and processing bandwidth to timestamp the signals from the three ultrasonic pulse detectors and relay this data down its USB link.

Figure 3:
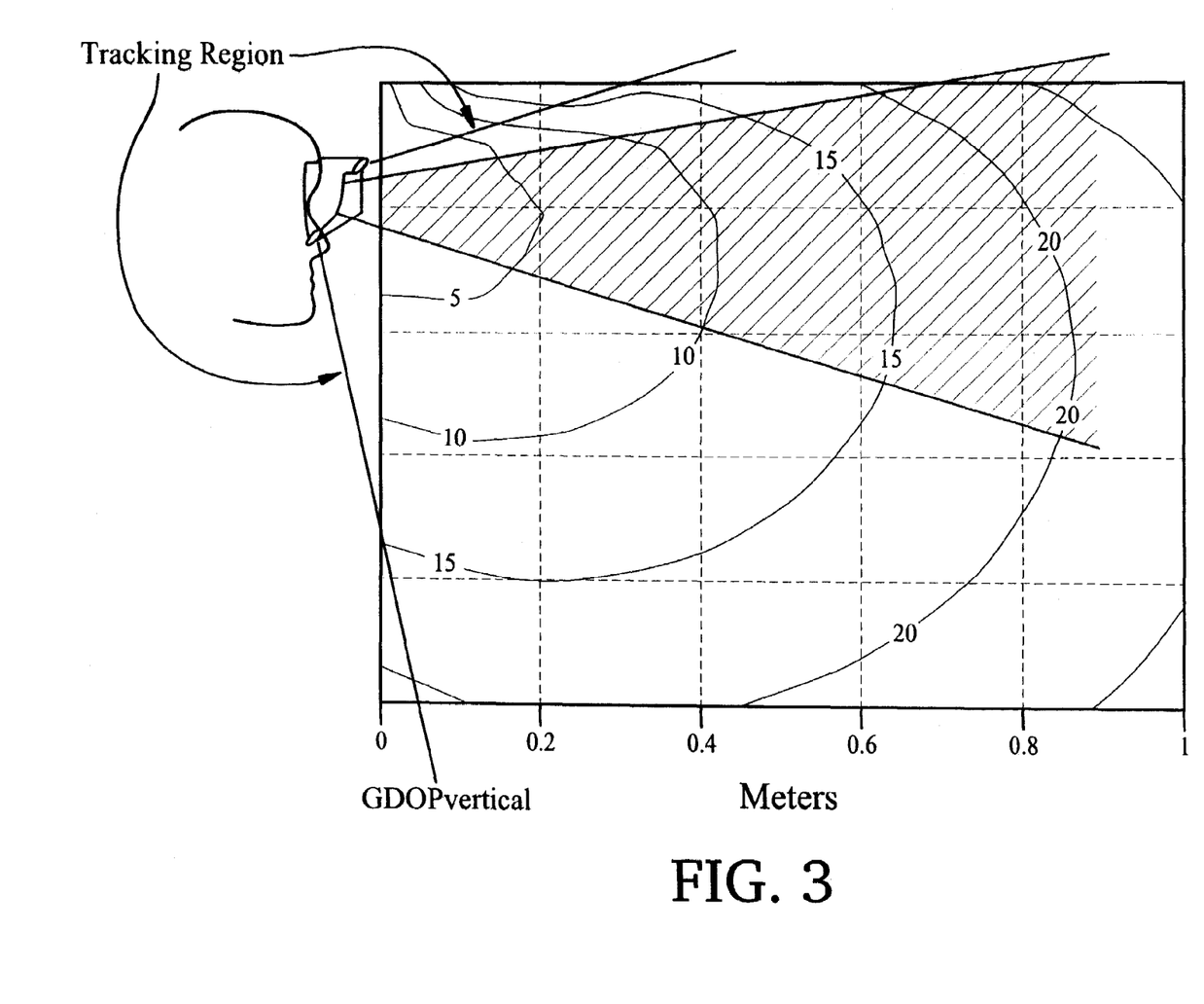
FIG. 3 is a graph of tracking coverage and relative resolution.

The ultrasonic tracking technology can be modified to take advantage of the very short range requirements. First, ultrasonic frequency may be increased from 40 KHz to a higher frequency. This increases the attenuation in air, and virtually eliminates reverberation and interference between nearby users. Second, the system can take advantage of the much reduced reverberation and the short time-of-flight to increase the update rate of tracking to, say, 240 Hz, thus allowing the system to average 4 position samples for each 60 Hz graphics update, or track up to 4 beacons at 60 Hz. To calculate the resolution that this would yield in various parts of the tracking volume we calculated the Geometric Dilution of Precision (GDOP) throughout the tracking volume given the intended geometry of the microphone mounts on the headset. The intended headset geometry, tracking range and optical field of view are illustrated superimposed on an isogram of a vertical slice through the GDOP data in FIG. 3. The plane of the microphones is angled downward 45° to insure that the system has tracking coverage for hands in the lap. The resolution at any point in space is the range measurement resolution (about 0.1 mm for short range ultrasonic measurements using 40 KHz) multiplied by the GDOP value, divided by 2 as a result of the 4× oversampling and averaging. Thus the expected resolution is approximately 0.5 mm at a distance of 400 mm away from the headset.

A goal of a wearable computer is to keep the user's hands free to perform tasks. For this reason, the system uses a wireless 3-DOF ring pointer for interaction. The FreeD ring-mouse previously described is approximately the right size. In some implementations of the system, the tracker will need to be triggered by a unique IR code from the headset, so that multiple beacons can be tracked.

In interactive visualization and design (IVD) and many other VR applications, a pen-style input device may be more useful. An implementation could use a wireless 5-DOF pen using the same basic technology as the 3-DOF ring pointer, but employing two emitters that are activated in an alternating sequence. A compact omni-directional pen could be implemented using cylindrical radiating ultrasonic transducers that have been developed by Virtual Ink (Boston, Mass.), mounted at the ends of a cylindrical electronics unit approximately the size of a normal pen, with two mouse buttons.

An additional device that could be included in the system and whose applications are discussed below is a small wireless anchor beacon that can be easily stuck to any surface. Ultrasonic beacons from InterSense are of suitable size and functionality.

Portable VR Application

Object Selection and Manipulation Exploiting Proprioception

M. Mine, F. Brooks, and C. Sequin. (Moving Objects in Space: Exploiting Proprioception in Virtual Environment Interaction. In SIGGRAPH 97 Conference Proceedings, ACM Annual Conference Series, August, 1997), have discussed the benefits of designing virtual environment interaction techniques that exploit our proprioceptive sense of the relative pose of our head, hands and body. A variety of techniques were presented, such as direct manipulation of objects within arms reach, scaled-world grab, hiding tools and menus on the users body, and body-relative gestures.

Implementations of the invention have advantages over conventional world-frame tracking systems for implementing these techniques effectively. With conventional trackers, any error in head orientation tracking will cause significant mismatch between the visual representation of the virtual hand and the felt position of the real hand, making it difficult to accurately activate hidden menus while the virtual hand is not in view. With implementations of the invention, the head orientation accuracy is immaterial and visual-proprioceptive match will be good to the accuracy of the ultrasonic tracker—typically 1-2 mm.

Locomotion & View Control Tricks

This section describes a few techniques to permit user locomotion and view control.

Flying and Scaled-World Grab

The usual navigation interface device in fly-through virtual environments is a joystick. This is appropriate for a flight simulator, but reduces one's sense of presence in terrestrial environments, where turning one's body toward the destination is more instinctive than turning the world until the destination is in front. Implementations of the invention support this more immersive type of flying. No matter how one turns, if she raises a hand in front of her it will be trackable, and can be used to control flight speed and direction. Better yet, she can use two-handed flying, which can be performed with the arms in a relaxed position and allows backwards motion, or the scaled-world grab method to reach out to a distant object and pull oneself to it in one motion.

Walking Using Head Accelerometers as a Pedometer

For exploratory walk-throughs, the sense of presence is greatest for walking, somewhat reduced for walking-in-place, and much further reduced for flying. M. Slater, A. Steed and M. Usoh (The Virtual Treadmill: A Naturalistic Metaphor for Navigation in Immersive Virtual Environments. In *First Eurographics Workshop on Virtual Reality*, M. Goebel Ed. 1993), and M. Slater, M. Usoh and A. Steed (Steps and Ladders in Virtual Reality. In *Proc. Virtual Reality Software & Technology* 94, G. Singh, S. K. Feiner, and D. Thalmann, Eds. Singapore: World Scientific, pages 45-54, August 1994) have described a "virtual treadmill" technique in which a neural network is trained to recognize the bouncing pattern of a position tracker on an HMD, and thus control virtual motion. Inertial head-orientation trackers do not normally output the position obtained by double integrating the accelerometers, because it drifts too much to be useful, but it seems reasonable that pattern analysis of the acceleration signals would produce good results.

Head-Motion Parallax Using Anchor Beacon

When working with close objects, head motion parallax is an important visual cue. It can be achieved with the tracking system of the invention on demand by using a trick. Normally, the system uses the 3-DOF position vector from the user's head to the hand-mounted beacon to track the position of the hand relative to the head, maintaining the head location fixed. When desired, the user may hold the hand still (say on a desk), and push a button to reverse this process, so that the tracker driver interprets the negative of the measured vector (in world frame) as a position update of the head relative to the stationary hand. He can then move his head back and forth to look around an object, and release the button when his viewpoint is repositioned for optimal viewing. After flying or walking to an area, this may be a convenient way of making finely controlled viewpoint adjustments using natural neck motion. Note that this operation is equivalent to grabbing the world and moving it around with one's hand, which may be a more convenient maneuver while standing.

Implementations of the invention can perform full 6-DOF head tracking using only one fixed reference point in the environment, while most acoustic and optical trackers require at least three. This works in the invention because head orientation is completely constrained by the sourceless head-tracker. This observation suggests another interesting trick. One may carry an extra wireless anchor beacon in a pocket and place it down on the table or stick it to a wall near a work area. Within range of this beacon, he can enjoy full 6-DOF tracking of both head and hand.

Wearable Computing Information Cockpit Interface

Information Cockpit Metaphor

In the field of wearable computing, three modes of displaying objects in a head-mounted display have been discussed. Head-stabilized objects are displayed at a fixed location on the HMD screen, so they move with your head motion and require no tracking. World-stabilized objects are fixed to locations in the physical environment. To cause them to stay fixed despite user head-motion requires full 6-DOF head tracking. Body-stabilized objects are displayed at a fixed location on the information surround, a kind of cylindrical or spherical bubble of information that follows the user's body position around. Head orientation tracking allows the user to look at different parts of the surroundings by turning his head, but position tracking is not needed.

Pure head-stabilized displays are usually used with small opaque monocular monitors mounted off to the side of the user's field of view. Without head tracking, this is better than having a display directly in front of the eye with information constantly blocking the frontal view. Use of this paradigm is widespread, and most of the wearable computer vendors provide this style of untracked sidecar display. This is roughly equivalent to wearing your desktop computer on your belt with the monitor mounted on a headband so that it is always available for hands-free viewing.

At the other end of the spectrum are world-stabilized AR displays, which must be implemented using see-through optics placed directly in front of the eyes. For a variety of applications such as surgery, construction and maintenance, this is a highly valuable capability. However, it requires sophisticated tracking and calibration, and is likely to remain a high-end subset of the total wearable computing market for quite a few years.

In the middle ground of complexity are the less common body-stabilized displays, which also tend to be implemented with see through HMDs. As implemented by S. Feiner, B. MacIntyre, M. Haupt, and E. Solomon (Windows on the World: 2D Windows for 3D Augmented Reality. In Proc. ACM UIST 93. ACM Press, November 1993) objects were drawn on a 170° horizontal by 90° vertical portion of a sphere. To prevent user disorientation, this hemispherical "virtual desk" was kept in front of the user's body by mounting an additional orientation tracker on the user's torso, and using the difference between the head yaw and torso yaw to pan the viewport. The desk was thus slaved to the user's torso, and the user could easily locate windows on it using his innate knowledge of head turn relative to the torso. This is intuitive but has the drawback that an additional orientation sensor must be mounted on the user's torso. This adds cost, makes the system more difficult to don, and causes the virtual desk to shift around in response to slight postural shifting of the user's torso, wobbling of the sensor mount, or metallic distortion of the relative magnetic heading between the two sensors. An implementation of the invention uses a variation on this theme, based on an "information cockpit" metaphor instead of a body-stabilized desk.

The information cockpit consists of a clear windshield, optionally drawn as a thin wireframe border, and a cluster of virtual instruments around it. As with the body-stabilized technique, the user's head is always in the center of the cockpit, but the heading direction of the cockpit stays fixed until the user changes it. Generally, the user first positions the windshield towards the objects he will be working on with his hands, and keeps the windshield area fairly clear of augmentations so that he can see what he is doing. Thereafter, the user can turn to look at the instruments, with or without turning his torso, and the instruments will not move. To prevent the user from becoming disoriented or being forced to strain his neck as he moves around, the implementation provides the user with steering techniques.

Outdoor Navigation Application

Figure 4:
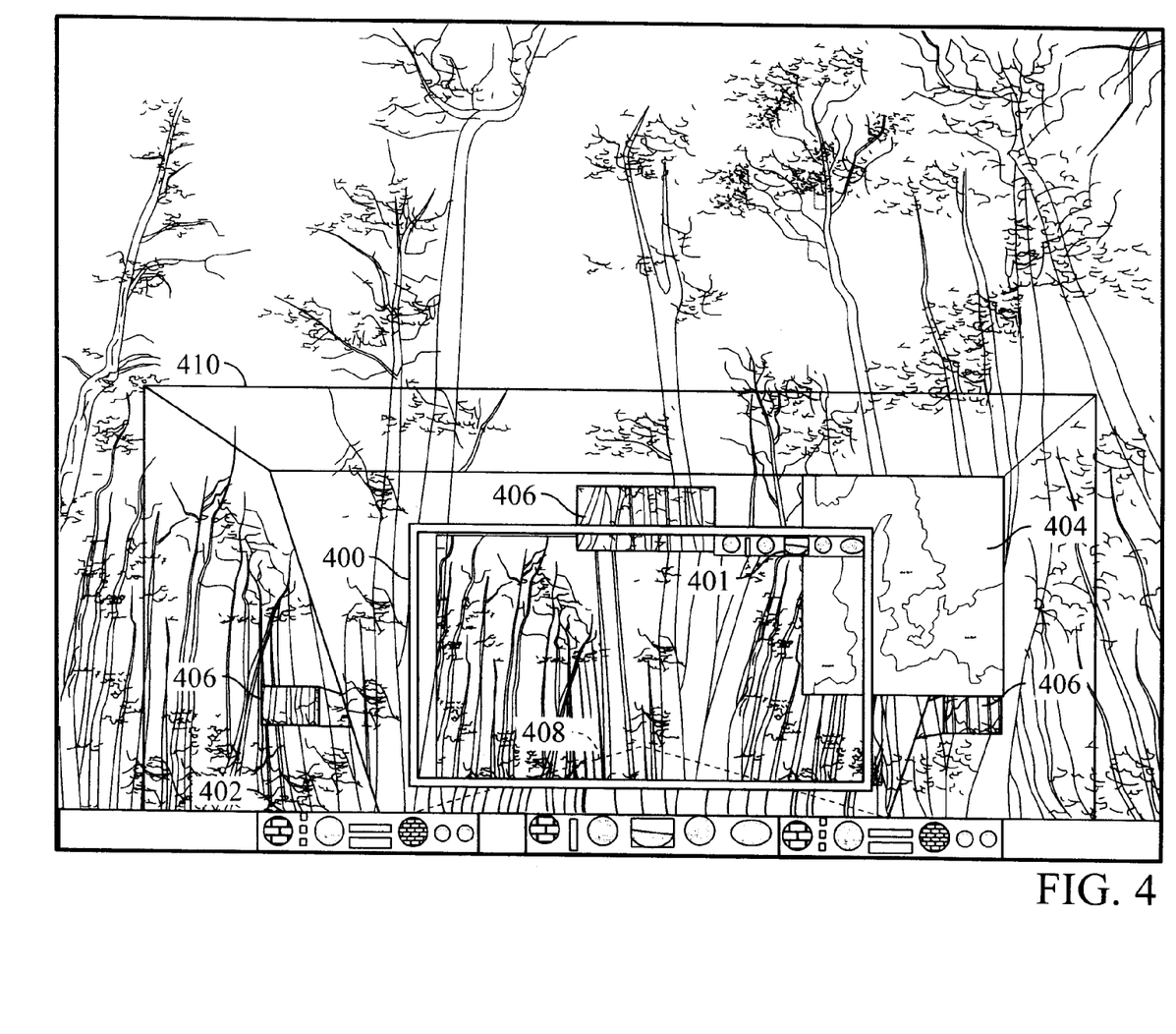
FIG. 4 is a view of an information cockpit.

FIG. 4 shows an example of an information cockpit for an outdoor navigation application. The active field-of-view of the see-through HMD is indicated by heavy black rectangle 400. Thus only the augmentations within this rectangle are visible to the user, but rotating the head moves this active view port around the scene and reveals the other augmentations once they are inside of it. In this example there are a few frequently-used icons 401 that are fixed (i.e. head-stabilized) in the upper right of the heads-up display that will always be visible. There are additional icons 402 in the dashboard that are stabilized to the information cockpit, and therefore can only be seen when the user looks down a little to check them. Some of these are miniature information instruments, such as dials and gauges, while others are icons used to bring up larger information instruments such as a web browser or interactive map display. By clicking on the map icon on the dashboard, the full-size map application window 404 pops up in the middle of the active display area. The user may either quickly examine it then minimize it again, or save it for on-going reference by fixing it to a convenient spot on the information cockpit "windshield" 410 as has been done in FIG. 4. The user can see a corner of the map in the current view, but can look at the whole map again by looking up and to the right. Virtual rear view mirrors 406 (fed by a video camera on the back of the head) have likewise been placed in three locations on the virtual cockpit, but the user can re-position or close any of these four information instruments at any time. In this example, the heading direction of the cockpit is controlled by the application in order to guide the user to a destination. Using a GPS receiver in the user's wearable computer, the application orients the cockpit along the direction from the user's current position to the destination, so he need only follow the dotted lines 408 to their vanishing point on the horizon to walk in the correct direction. This provides a virtual sidewalk in the forest, much as pilots are guided by virtual tunnel-in-the-sky displays. In an urban setting, the computer would use map correlation to orient the cockpit along the current road in the suggested walking direction.

Steering and Interaction

The ring tracker can be used for several purposes in wearable computer applications: direct pointing to objects, virtual mouse pad cursor control, command gestures, and measuring or digitizing.

Direct Pointing to Objects

When the ring tracker enters the viewing frustum of the HMD, the cursor jumps to the location of the ring and follows it. This provides rapid direct selection of objects, taking full advantage of natural eye-hand coordination. In the virtual cockpit, one may glance up from the windshield to a side panel, see an instrument he wants to use, reach out to exactly where he sees it and click on it with one of the ring buttons to activate it or drag it into another view.

Many useful operations can be accomplished most easily with direct selection and manipulation of objects. You can move and resize windows (i.e. instruments) the usual 2D way by dragging their borders. However, you can also exploit the 3D tracking of the ring to simultaneously move and resize an instrument. Simply grab the title bar and pull it toward you to make it larger or away from you to make it smaller, while simultaneously positioning it. If you pull it in towards your head far enough, as if to attach it to your HMD, it will change colors, indicating that if you let go of it, it will remain as a head-stabilized object. This is effectively like grabbing an instrument off your cockpit panel and attaching it to your Heads-Up-Display (HUD) so that it will always be visible in the foreground no matter where you look. By pushing it away far enough it will convert back to a cockpit panel instrument.

One of the cockpit windows that can be manipulated in a similar manner is the windshield itself. Simply click on any clear area of the "glass" where there aren't any graphical objects you might accidentally select, then drag it left/right or up/down to rotate the whole cockpit in space. This is one way of "steering" the cockpit, which is particularly useful for small course corrections or size adjustments or to refocus your attention on another area of the workbench nearby.

Virtual Mouse Pad Cursor Control

Though fast and intuitive, the direct pointing technique would become very tiring if used to work with an instrument that requires extended repetitive clicking, such as a web browser or hypertext manual. A virtual mouse pad technique can overcome this problem. As soon as the user's hand drops below the viewing frustum of the HMD, the cursor control automatically switches into this mode, in which left-and-right motion of the ring moves the cursor left-and-right, in-and-out motion moves it up and down, and vertical position has no effect. This allows the user to rest his hand comfortably in his lap or on a desk, and control the cursor by sliding his hand horizontally a few inches as if on an imaginary mouse pad.

It is desirable that if the user positions the cursor on a particular object then moves his head without moving the ring, the cursor will remain on the object. This means that the cursor is drawn as an object in the cockpit-stabilized coordinates rather than the head-stabilized screen coordinates. This has several implications. First, the cursor is associated with a point on the spherical information cockpit surface, only a portion of which is visible in the HMD, so the cursor could be out of view and quite difficult to find. A wiggling gesture is then used to bring it back into the current center of display. Second, the ring tracking must be calculated in the cockpit stabilized coordinate frame, which means that if the user turns to the right, an "in-and-out" motion switches from cockpit x-axis to y-axis and has an unexpected effect. To avoid this, the ring position is transformed into cylindrical polar coordinates and the radial and tangential components are used to control cursor vertical and horizontal motion respectively.

Command Gestures

Ring tracker gestures may be used as a substitute for voice commands in situations where visual theatrics are more acceptable than audible ones, or where it is too noisy for reliable speech recognition. In general, gestures should commence outside of the direct pointing and virtual mouse pad regions, in order to avoid accidentally selecting and moving objects. This leaves the sides and top of the viewing frustum, and the first few inches in front of the face (which are not used for direct pointing). The gestures are executed by depressing a mouse button, possibly making a certain movement, then releasing the button. They are always relative to the head in order to exploit proprioception, and the fact that the head is tracked, while the rest of the body is not. Many gestures may be defined, but the most commonly needed is a boresight command to reset the heading direction of the cockpit to the current forward direction of the person's head as he walks about.

Measuring or Digitizing

Most people can hold their head very still, which opens the possibility that the ring tracker can be used to make measurements between two points that are close enough that both can be seen without moving the head. This might be useful in an application such as taking inventory of how many pieces of each size are in a stockroom. Likewise, an application might ask you to quickly digitize a few corners of a component so it can determine based on the dimensions what model of the component you are looking at and locate the appropriate manual pages.

To measure the distance between two close objects that are both within the display FOV at the same time, the user clicks both objects while holding his head still. The distance is computed as the norm of the difference of the two vector positions thus stored.

For two objects that are too far apart to be in the display FOV at once, a more elaborate procedure may be employed. The user first looks at the first object, positions the pointer beacon on it and depresses a button. At the moment the button is pressed, a world frame position vector (p1) of the first object is stored and then the tracking mode is switched to 6-DOF tracking of the head relative to the stationary hand-held pointer, as previously described. While holding the pointer stationary on the object and keeping the button depressed, the user then repositions his head until the second object is in view, releases the button, and holds his head still while moving the pointer to the second object, then clicking it to capture the second position vector (p2) in the same world coordinate frame as the first. This technique may be practiced either with a single pointing beacon operated by one hand, or using separate pointing beacons in each hand, to achieve approximately the same functionality as a conventional tape measure, but with the added benefit that the measurements are automatically stored on a digital computer.

Relationships among remote objects may also be measured using standard triangulation surveying methods, exploiting the functional similarity of a see-through HMD optic with orientation tracker to a surveyor's theodolite (although a tripod mounted theodolite is likely to be more accurate).

Mixed Display and AR-on-Demand Applications

The previous section presented the information cockpit as a specific variation on Feiner's body-stabilized information surround. However, the cockpit metaphor also allows the user to make use of the head-stabilized and world-stabilized coordinate frames at the same time. The previous section gave one example of this in which the pilot drags information from the cockpit onto the HUD, which makes it head-stabilized. For example, one may wish to have an alerting device always visible in the HUD that pops up notifications whenever a phone call, page or email is received, or when a scheduled meeting is about to begin, etc.

Likewise, one may wish to grab a certain instrument and paste it onto a physical object in worldspace. For example, while debugging a circuit board, you could overlay an interactive block diagram or schematic on the board, and attach a virtual scope trace to your hand that is holding the scope probe (which is possible because the hand is tracked by the ring pointer). To do this, you must first plant an anchor beacon, then click three corners of the circuit board to align the block diagram to it.

One important reason to plant anchor beacons is to create a shared AR workspace for communication or collaboration with coworkers as described in M. Billinghurst, S. Weghorst and T. Furness (Shared Space: An Augmented Reality Approach for Computer Supported Cooperative Work. Virtual Reality Vol. 3(1) 1998) and D. Schmalstieg, A. Fuhrmann, Z. Szalavari, and M. Gervautz (Studierstube: An Environment for Collaboration in Augmented Reality. In CVE 96 Workshop Proceedings, September, 1996) incorporated by reference. Imagine a paperless construction site with numerous workers building a structure according to the plans they are viewing on their wearable computers. It is nice that they don't have to drag large rolls of blueprints around, but they have no way to stand around a blueprint and point to things. The solution is for someone to drop two anchor pins on a table, defining the top two corners of a virtual blueprint or model that each person can see in correct perspective from his own vantage point.

A Variant Technique for Tracking the User's Hand

Some implementations of the invention use an inertial orientation sensor to track the rotation of the head, and an acoustic or optical position tracker to track the position of the hand relative to the head. For many applications, the performance of the acoustic or optical position tracker is sufficient. Furthermore, it has the great advantage that the item being tracked can be a small wireless transponder, or even a passive marker. For some applications, such as the ring-mounted pointing device for wearable computing, this is an overwhelming advantage.

However, for some applications, such as a virtual reality game, it may be desired to have the virtual object controlled by the hand tracker (e.g. a virtual sword or gun or racquet) respond to the hand motion with extremely fast smooth response. Acoustic, magnetic, or videometric hand trackers may introduce noticeable latency or jitter in these applications. Inertial position and orientation trackers are well known to provide extremely low latency and low jitter, but they require drift correction, especially if tracking position and not just orientation is desired. In a typical virtual reality application, the user's head and hand may both be tracked with 6 degrees of freedom relative to an external reference frame by using inertial sensors on the head and on the hand to measure their motion with a high update rate and low latency. The drift of these inertial sensors is corrected by making measurements with an ultrasonic, optical or magnetic tracking reference device mounted in the environment.

In some implementations of the present invention, the drift and latency issues can be addressed without the requirement of a reference device mounted in the environment. Foxlin, "Head-tracking Relative to a Moving Vehicle or Simulator Platform Using Differential Inertial Sensors," Proceedings of Helmet and Head-Mounted Displays V, SPIE vol. 4021 (2000) and co-pending U.S. patent application Ser. No. 09/556,135, which are incorporated herein by reference, describe techniques which enable the use of inertial sensors to track the motion of an object relative to a reference frame that is moving, even where the motion is not known completely. These techniques require that inertial sensors be attached to the moving body being used as the reference frame (in the cited references an example of the reference frame is given of a vehicle or motion-platform and an example of the tracked object is given as a head; in the present invention, the moving reference frame may be the user's head and the tracked object may be the user's hand or hand-mounted or hand-held object), as well as to the object being tracked (here, e.g., the user's hand). The techniques utilize angular rate and linear acceleration signals from the sourceless orientation trackers on the reference frame and on the tracked object to derive a differential inertial signal representative of the motion of the object relative to the frame. In embodiments of the present invention, this technique may be used to derive a differential inertial signal representative of the motion of the hand relative to the head.

Figure 5:
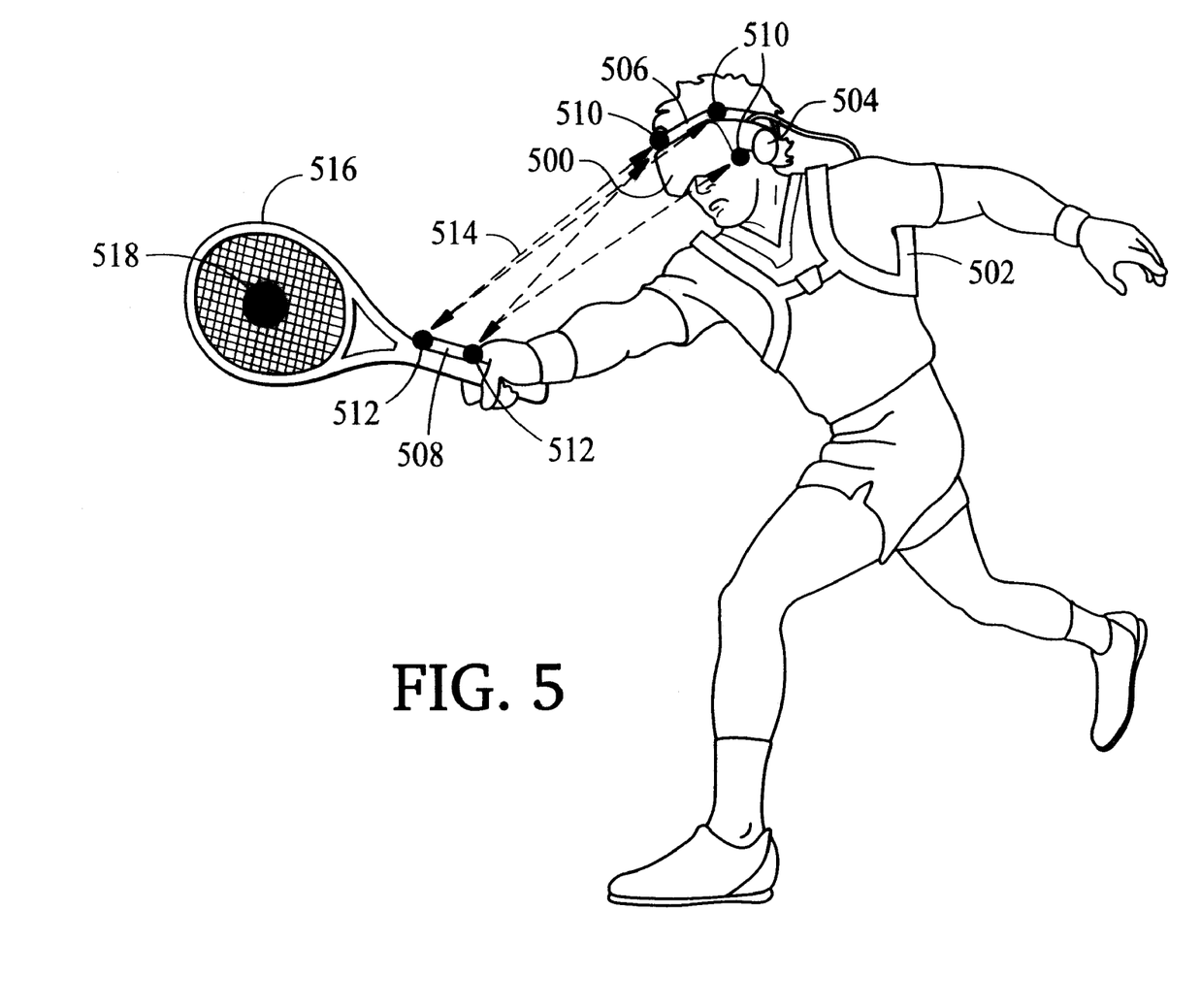
FIG. 5 shows a user using a virtual reality game.

FIG. 5 illustrates a user wearing a portable VR tennis game or training system. The computer and batteries are contained in backpack 502, which is cabled to HMD 500 to which are mounted inertial sensors 506 and ultrasonic transducers 510. He is holding a hand-held object 516, in this case a tennis racquet, to which are attached inertial sensors 508 and ultrasonic transducers 512. These hand-mounted devices may be powered by their own batteries and communicate by wireless means to the system on the users head and torso, or there may be an additional cable between the racquet and the backpack. The signals from inertial sensors 506 are processed by a first algorithm, preferably a drift-corrected inertial orientation tracking algorithm such as described in U.S. Pat. No. 5,645,077 to obtain a sourceless measurement of the head orientation. In addition, the signals from the hand-mounted inertial sensors 508 and the head-mounted inertial sensors 506 are jointly processed to track both the position and orientation of the hand relative to the head, preferably using an algorithm such as described in Foxlin (2000) and co-pending U.S. patent application Ser. No. 09/556,135. The drift of this relative inertial tracking is corrected by the relative range measurements 514. In the illustrated system there are also earphones 504 to provide 3D spatialized audio, and a haptic feedback device 518 to provide tactile feedback to the user when the virtual ball has hit the virtual racquet.

In general such a system may be used for other types of activities, such as a sword-fighting or gun-fighting game or trainer, a surgical trainer, an immersive design environment, a human-computer interface, or any other application known or not yet known which requires tracking of a user's head and one or more limbs or limb-mounted devices. While it is especially advantageous for mobile or portable applications in which the computer is wearable, this is not a requirement, and the user may be cabled to an off-body computer or communicate with an off-body computer through a wireless connection. In this case, it is still an advantage of the current invention that the tracking is accomplished without setting up an off-body reference device.

Other embodiments are within the scope of the claims.

The implementations described above track the hand with a head-mounted acoustic tracking system because this technology can be totally embedded in a lightweight headset and achieve high resolution tracking over a very wide FOV.

However, the head mounted position tracker need not be acoustic. It may be an electro-optical system which tracks LEDs, optical sensors, or reflective markers, or a video machine-vision device that recognizes the hands or fingers or some special markers mounted on the hands or fingers or handheld object, or even a magnetic tracker with a magnetic source held in the hand and sensors integrated in the headset or vice versa, or an RF position locating device.

The implementation described above use inertial sourceless orientation trackers. Other implementations may use other forms of head orientation trackers, including trackers based on tilt-sensing or magnetic compass sensors, or any other form of head orientation tracker. In fact, some implementations may use no head orientation tracker. In this case, the tracking system would not enable the user to look around in a virtual environment by turning his head, but it would still be useful for manual interaction with computers using head-worn displays.

A number of embodiments of the invention have been described. Nevertheless, it will be understood that various modifications may be made without departing from the spirit and scope of the invention.

What is claimed is:

1. A method comprising:
   mounting a sourceless orientation tracker on a user's head,
   using a position tracker comprising a radiated energy detector to track a position of a first localized feature associated with a body part of the user other than the head relative to the user's head; and
   generating data representative of the tracked position.

2. The method of claim 1, further comprising mounting a virtual reality display on the user's head that contains one or more objects.

3. The method of claim 2, further comprising using said tracked position to display in the virtual reality display an interaction of said body part with an object of said one or more objects.

4. The method of claim 3, wherein said interaction comprises virtual direct manipulation of said object by the user.

5. The method of claim 3, wherein said interaction comprises a scaled-world grab.

6. The method of claim 3, wherein said interaction comprises interacting with tools hidden on the user's body.

7. The method of claim 3, wherein said interaction comprises interaction with menus on the user's body.

8. The method of claim 3, wherein said object includes a second body part, and wherein displaying said interaction comprises displaying a relative position between said body part and said second body part.

9. The method of claim 3, further comprising, in response to the user virtually grabbing an object displayed in the virtual reality display, moving the user toward the object in the virtual reality display.

10. The method of claim 3, wherein the virtual reality display has a frame of reference and further comprising determining a change in position of the user's head and, in response to said change in position, changing the viewpoint of the virtual reality display relative to the frame of reference.

11. The method of claim 10, wherein determining a change in position comprises determining a change in the position of the user's head relative to said body part.

12. The method of claim 2, wherein said virtual reality display comprises a fly-through virtual environment.

13. The method of claim 12, further comprising controlling flight speed based on said position.

14. The method of claim 12, further comprising controlling flight direction based on said position.

15. The method of claim 12, wherein tracking said position comprises tracking a position of both hands of the user and further comprising using the tracked positions to control one of flight direction or flight speed.

16. The method of claim 1, further comprising using signals obtained from said sourceless orientation tracker to compute a distance traveled by said user in a virtual reality environment; and generating data representative of such distance.

17. The method of claim 1, further comprising:
   (a) providing a virtual reality display having a frame of reference;
   (b) displaying in said virtual reality display an object associated with said body part;
   (c) providing an input mechanism for receiving an input from said user;
   (d) operating said virtual reality display in a first mode comprising, in response to a change in said tracked position, displaying a change in the apparent position of said object relative to said frame of reference; and
   (e) in response to an input from said input device, operating said virtual reality display in a second mode, comprising in response to a change in said tracked position, displaying a constant apparent position of said object relative to said frame of reference.

18. The method of claim 17 wherein, in said second mode, in response to a change in said tracked position, the viewpoint of said virtual reality display changes relative to said frame of reference.

19. The method of claim 1, further comprising placing a portable anchor beacon in a fixed location and using signals received from said beacon to track a position and an orientation of both said head and said body part and to generate data representative of such positions and orientations.

20. The method of claim 1, further comprising providing a head mounted display including a body stabilized information cockpit and displaying data to a user using such display.

21. The method of claim 20, wherein said information cockpit comprises a clear windshield.

22. The method of claim 21, further comprising, in response to user selection of an object of the one or more objects, displaying an information display window in the head mounted display.

23. The method of claim 22, wherein said information cockpit comprises a clear windshield and further comprising fixing said information display window to said clear windshield.

24. The method of claim 20, wherein said information cockpit comprises one or more objects.

25. The method of claim 24, further comprising using said tracked position to determine that the user has selected an object of the one or more objects.

26. The method of claim 24, further comprising modifying the appearance of an object of the one or more objects in response to a change in said tracked position.

27. The method of claim 26, wherein modifying the appearance of the object comprises changing the apparent distance of the object from the user in the display.

28. The method of claim 27, wherein the body part is the user's hand, and wherein the change in said tracked position results from the user virtually manipulating the object.

29. The method of claim 28, wherein said information cockpit includes a clear windshield and further comprising attaching said object to said windshield by virtually manipulating said object.

30. The method of claim 26, wherein said object is a cursor.

31. The method of claim 30, wherein said change in said tracked position comprises a component in a plane, and wherein the appearance of the cursor is modified in response to said change by moving it a distance based on magnitude and direction of said planar component.

32. The method of claim 20, wherein said information cockpit comprises one or more virtual instruments.

33. The method of claim 20, wherein said information cockpit comprises a virtual rearveiw mirror.

34. The method of claim 33, wherein said virtual rearview mirror may be repositioned by the user.

35. The method of claim 20, further comprising providing in said display indicia of a route toward a destination.

36. The method of claim 35, further comprising use a GPS receiver associated with said user to receive position data and using said position data to determine the position of said indicia in said display.

37. The method of claim 20, further comprising detecting a predefined hand gesture of the user and, in response to said hand gesture, resetting the heading direction of said cockpit.

38. The method of claim 1, further comprising sequentially positioning said localized feature at a first and then a second location, using said position tracker to determine positions of said first and second locations, and computing a distance between said positions, and generating data representative of such distance.

39. The method of claim 1, wherein said radiated energy detector comprises an acoustic detector.

40. A method comprising:
mounting a first sourceless orientation tracker on a user's head;
mounting a second sourceless orientation tracker on a body part of the user other than the user's head; and
utilizing angular rate and linear acceleration signals from said first and second trackers to derive a differential inertial signal representative of a motion of the body part relative to the head.

41. The method of claim 40, further comprising using signals from said first tracker to obtain a sourceless measurement of the orientation of the user's head.

42. The method of claim 41, further comprising using signals from said first and second trackers to track both the position and orientation of the body part.

43. The method of claim 42, further comprising using relative range measurements between said head and said body part to correct drift in said tracking of the position and orientation of the body part.

44. The method of claim 43, further comprising providing signals to a haptic feedback device based on said tracked position or said tracked orientation.

* * * * *